Patented Nov. 24, 1936

2,062,134

UNITED STATES PATENT OFFICE 2,062,134

RUTILE PIGMENTS

Paul Kubelka, Prague, and Josef Srbek, Aussig, Czechoslovakia, assignors, by mesne assignments, to E. I. du Pont de Nemours and Company, a corporation of Delaware No Drawing. Original application February 20, 1932, Serial No. 594,384. Divided and this application September 8, 1933, Serial No. 688,655. In Germany March 20, 1931

17 Claims. (Cl. 23—202)

This invention relates to processes of hydrolizing titanium chloride solutions in which a titanium oxygen compound seed is added to the solution to be hydrolized and to a new type of $TiO_2$ pigment characterized by being of rutile crystal form.

In U. S. Patent 1,758,528, May 13, 1930, to W. Mecklenburg, there is described a process of hydrolizing solutions of titanium salts in which a seed is added to the titanium salt solution, said seed having been prepared by heating a titanium oxygen compound precipitated by reducing the acidity of a titanium salt solution to a pH of below 7 and subsequent stabilization by cooling. This prior process relates preferably to the acceleration of the hydrolysis of the common titanium sulfate solutions and those seeds were found to be particularly useful which, when added at ordinary temperature to the solutions to be hydrolized, dissolve therein already on moderate heating forming an apparently homogeneous solution.

We have found that in contradistinction to the preferred conditions obtaining in the hydrolysis of titanium sulfate solutions a different crystal character in the precipitated titanium oxygen compound and different and improved properties in the precipitated and subsequently calcined titanium oxygen compound are produced when hydrolyzing titanium chloride solutions with a seed suspension prepared in a somewhat different manner.

In the case of hydrolizing sulfate solutions the seed should be soluble on moderate heating in the sulfate solution to be hydrolized, such seed being, for instance, obtained by reducing the acidity of the solution from which the seed is prepared to a pH from about 4 to 4.5; we found that in hydrolizing titanium chloride solutions the best results are obtained when hydrolizing with a seed which was precipitated from a solution, the acidity of which had only been reduced to a lower pH, for instance, below 3.5 and which may not be soluble in said titanium chloride solution. On calcining titanium oxygen compounds obtained by hydrolysis of titanium chloride solutions by means of such a seed, a titanium dioxide pigment of surprisingly high tinting strength is obtained.

Based on these observations, the invention comprises a process of producing titanium oxygen compounds of peculiar crystal character which, on heat treatments, produce titanium dioxide pigments of rutile crystal form and high tinting strength, said process comprising hydrolizing a titanium chloride solution in the presence of a seed which has been produced by decreasing the acidity of the titanium salt solution to a low pH of, for instance, less than 3.5 and which in its preferred form is insoluble in said titanium chloride solution on moderate heating.

It is well known that conditions obtained in the preparation of titanium dioxide pigments are of far reaching influence upon the tinting strength of the pigment. The tinting strength of pigments is commonly compared by determining the amount of the white pigment required to "lighten up" to a certain point a given amount of a colored pigment, for instance, ultramarine, when thoroughly incorporated in a colorless oil. When comparing various titanium dioxide pigments in this test, it will be found that differences up to 50% in the tinting strength can be obtained by modifying one single condition in the preparation of such pigments. It was found that in the preparation of titanium dioxide pigments by hydrolysis of titanium sulfate solutions and subsequent calcination, slight changes in the following conditions were of determining influence upon the degree of tinting strength, namely, concentration of the solution to be hydrolized, hydrolysis temperature and calcination temperature.

The $TiO_2$ pigments obtained by previous hydrolysis and calcination processes are all substantially of the anatase crystal form. While it has been possible to transform native anatase into rutile by heating to excessively high temperatures, it has been impossible to produce a white rutile suitable for pigmenting purposes by heat treatments of artificially precipitated titanium oxide.

According to the present invention, one obtains a precipitate on hydrolysis which has a peculiar crystal structure. From concentrated solutions, the precipitate is of rutile crystal form which is not modified in the subsequent heat treating operations. The precipitate obtained from dilute solution may not definitely show the rutile form, but the products obtained therefrom on calcination are of rutile crystal structure.

Various processes have already been disclosed by which the tinting strength of titanium dioxide preparations obtained from sulfuric acid solutions was to be improved. To a limited extent this has been achieved by calcining hydrolytically precipitated titanium oxygen compounds in the presence of certain materials, such as, for instance, small amounts of alkali metal bisulfates. The process of influencing the hydrolysis of titanium sulfate solutions by the employment of certain seeds as disclosed in United States Patent 1,758,528 results also in an improvement of the tinting strength of the calcined titanium oxide. It is only possible, however, to influence the tinting strength by such means within relatively narrow limits and there results in such manner products which are substantially of the anatase crystal form.

According to the present invention we obtain titanium oxide pigments of rutile crystal form which are of considerably greater tinting strength by hydrolysis of hydrochloric acid solutions and subsequent calcination when the hydrolysis is effected in the presence of a titanium oxygen compound seed which has been precipitated by moderate heating of a titanium salt solution of a low pH, for instance, less than 3.5, such seed being substantially insoluble on moderate heating in the titanium chloride solution. Such titanium oxygen compound seeds are, for instance, obtained by reducing the acidity of titanium salt solutions to the desired low pH value and subsequent moderate heating. The reduction of the acidity can be achieved by diluting the solution or by mixing therewith a neutralizing agent, such as ammonium hydroxide, caustic alkali, alkali metal- or alkaline earth metal carbonates, etc. In order to make the titanium oxygen compound seeds more stable and therefore more useful, the precipitated seed can be submitted to a controlled cooling, the rate of which depends upon the temperature maintained during the precipitation and the degree of acidity.

While titanium oxygen compound seeds precipitated from solutions of a pH between 2 and 3 greatly improve the tinting strength of titanium dioxide pigments prepared by calcination of the products obtained by hydrolizing hydrochloric acid solutions in the presence of said seeds, seeds precipitated from solutions of lower acidity with pH values of, for instance, 5 to 7 have this property to a lesser extent. Seeds prepared from solutions of an acidity greater than pH 2 can also be used successfully. It is, however, necessary in such cases to exercise particular care in the stabilization of such seeds.

The amounts of titanium oxygen compound seeds to be used is of certain importance, in order to obtain the desired effect. It is best to determine in a preliminary test the most favorable amount of the seed to be used, which, as a rule, will be between 5 and 8% of the titanium compound, figured as $TiO_2$, to be hydrolized. A further improvement of the tinting strength of the desired titanium oxide pigment is obtained when the hydrolysis product is calcined in the presence of small amounts of an alkali metal bisulfate, which is eliminated by washing after calcination.

The following is a description of a process of hydrolizing a hydrochloric tintanium solution according to the present invention.

A hydrochloric acid titanium solution was prepared containing the equivalent of 150 grams $TiO_2$ per liter, and in which the ratio of tetravalent Ti to Cl was about 1:3. The solution contained no substantial amounts of iron or other metal salts. This solution was mixed with caustic soda to the point where its acidity was reduced to a pH of about 2.5. This solution was then heated for thirty minutes to 80° C. and quickly cooled to 50° C. A titanium oxygen compound seed was precipitated in this manner. This seed can be used as such, or separated from its mother liquor, washed out and the insoluble only used as a seed.

Such a seed was added to a hydrochloric acid titanium solution of the above composition in the proportion of 7 grams of the seed for each liter of the solution and the mixture heated to about 100° C. The hydrolysis of the titanium solution proceeded rapidly under these conditions and was nearly quantitatively completed in less than ten minutes. The hydrolysis product was separated from the mother liquor, washed out in the usual manner, mixed with about 2% potassium bisulfate, slowly heated to 900 to 950° C. in a rotary calciner and kept for about fifteen minutes at said temperature. The calcined titanium oxide was then finely ground by wet and dry milling, the washing out of the soluble salts being combined with wet milling. The so obtained titanium dioxide consisted substantially of rutile type particles of small and uniform size and the pigment had a tinting strength ⅓ greater than that of calcined anatase titanium dioxide.

It might be mentioned for the sake of comparison that on hydrolizing a similar solution in the absence of a seed, the hydrolysis yield after 10 minutes is still relatively small and reached practical values only after prolonged heating. The tinting strength of a titanium pigment obtained by hydrolysis in the absence of the seed, but calcined and finished in the same manner as described above, is quite insufficient and reached only about ½ the value of the above pigment. The difference between the tinting strengths of pigments obtained in the presence and absence of seeds from more concentrated titanium solutions is still more marked, as concentrated solutions produce in the absence of the seeds, pigments which are still more unsatisfactory.

The following is a description of another application of our invention to the preparation of a rutile $TiO_2$ pigment of excellent pigmenting properties.

An anhydrous $TiCl_4$ free from copper, vanadium and iron was used. This was allowed to run into concentrated hydrochloric acid (1:1 by volume) and the resultant oxychloride dissolved in water whereby a solution with 320 grams $TiO_2$ and 353 grams HCl, free and combined to $TiO_2$, per liter was obtained. (Atomic ratio 1Ti:2.4Cl.) This solution was used about 2 months after its preparation.

Dilute caustic soda heated to about 40° C. was mixed with a part of the above preserved titanium chloride solution with agitation, the temperature rising to 60° C. The amounts of reagents and the concentrations were so chosen to produce a final solution of a pH 2.0 and a concentration corresponding to 30 grams $TiO_2$ per liter. This liquor was then heated to 80° C. and held at this temperature for 30 minutes when it was cooled by addition of cold water to about 60° C., whereby it was diluted to a concentration corresponding to 20 grams $TiO_2$ per liter. This constituted the seed suspension.

The balance of the original titanium chloride solution was then mixed with enough concentrated hydrochloric acid to yield a solution in which the atomic ratio of Ti to Cl was 1:4. Sufficient of the above seed was then added to the $TiCl_4$ solution to have $TiO_2$ nuclei present in an amount equivalent to 8% of the quantity of hydrolizable titanium compound and the mixture was diluted with enough water to yield a solution for hydrolysis containing 55 grams titanium figured as TiO₂ and 100 grams HCl per liter. This solution was then heated to 90° C. with agitation in about 12 minutes and held at 90° C. for 30 minutes.

The precipitated hydrolysis product was then separated from the mother liquor by vacuum filtration, it being immaterial if the filtration is carried out immediately after completion of the hydrolysis or after a few days. The filter cake was then reslurried in water to form a suspension of about 250 grams of TiO₂ per liter of suspension. Potassium bisulfate was then added in an amount corresponding to about 1.5 grams per 100 grams of TiO₂, the suspension dried at 120° C. and calcined for 30 minutes at 950° C. The calcined product was ground in a porcelain ball mill for 1 hour dry and 5 hours wet, vacuum filtered, dried and pulverized.

The above examples describe a very satisfactory manner of producing high grade pigments with excellent yields from titanium chloride solutions. It will be understood that our invention is not limited to the particular conditions disclosed in these examples, but is applicable generally to titanium hydrochloric acid solutions, and that the addition thereto of seeds prepared by the reduction of the acidity of titanium salt solutions to a low pH value improves the hydrolysis of such solutions.

There is a definite but complicated relationship between the conditions obtained during preparation of the seed and its activity. Seeds of different activity may be required to obtain maximum hydrolysis yields and the most favorable pigment properties in the calcined product obtained from such hydrolysis products, according to the composition and concentration of the titanium hydrochloric acid solution to be hydrolyzed.

The lower the pH of the titanium solution is, from which the seed is obtained on heating, the more active it will be, whereas the heating thereof is of lesser importance; very active seeds are, however, less stable at high temperature and must be cooled quicker to preserve their activity than seeds produced at a higher pH value. Similarly, concentrated titanium solutions will require more active seeds than dilute ones, or more of lesser active seed. It is also to be noted that the age of the titanium chloride solution is of influence on the amount and type of seed required to produce maximum hydrolysis yield and quality. With freshly prepared solutions a smaller amount of seeding material is necessary than is the case with solutions a few days old. As in the technical application of our invention there is usually available a given type of titanium solution and a product of given pigment properties desired, which conditions vary from case to case, no general rules can be given as to the kind of seed to be used and it will be in most instances advisable to determine by preliminary experiments the most advantageous seed that can be used for a given solution and a given desired pigment.

The new and improved titanium dioxide pigment made according to our process has several new and distinctive properties. It consists wholly or in large part of rutile which is the crystalline form of titanium dioxide of the highest refractive index; it is a very white pigment of excellent brightness and without appreciable yellow or brown tint; it possesses an average particle size and a distribution of particle sizes which lead to the optimum pigment properties. These three characteristics have not been possessed by any titanium dioxide pigment previously available or which could be produced by previously developed processes.

The test we prefer to apply to define the crystal form of our pigment is examination by the X-ray method. This procedure has come into wide use during the last few years and comprises the photographing of the X-ray diffraction pattern of the powdered pigment. Any crystalline compound produces its own characteristic bands which are photographed on a sensitive film. By comparison of the spectrum of the pigment under test with standard materials its crystal structure can be determined. Tests on our improved pigment have proved that it contains only rutile without the other crystalline modifications of titanium dioxide, namely—anatase and brookite. The delicacy of the X-ray method is quite good but minor amounts of other crystalline modifications may be present. The tests on our products indicate that the major portion of the pigment is in the rutile modification and that usually no X-ray spectrum for any other titanium dioxide crystalline forms is obtained.

Another new and unexpected result of our process is the presence of rutile in the hydrolysis product before calcination. This hydrolysis product when subjected to the above described X-ray test shows the same characteristic rutile structure as the calcined pigment. The chief difference between the precipitated and heat treated products is that the diffraction bands of the former are broader indicating a smaller crystal size.

The particle size distribution curve of our improved pigment has been measured by the ultra centrifuge method.

This procedure was originally developed in Svedberg's laboratory and is discussed in its various aspects in the following references: Svedberg & Rinde J. A. C. S. 46, 2683 (1924); Nichols & Liebe—3rd Colloid Symposium 1925 page 283; Svedberg & Nichols J. A. C. S. 49, 2926 (1927); Svedberg & Heyroth J. A. C. S. 51, 552 (1929); Svedberg, Colloid Chemistry, special edition, 1928, pages 171 and following.

The procedure may be described briefly as follows: The pigment is dispersed in a glycerine solution without grinding and this suspension is placed in the centrifuge cell. The cell, with transparent walls, is located in the rotor of an ultra-centrifuge capable of rotating at a speed of 2400–5600 R. P. M. The system is so arranged that a beam of light can be passed through the cell during its rotation and photographs taken of the level of the pigment particles in suspension in the glycerine solution. The rate at which sedimentation occurs during rotation at a given speed is determined, of course, by the particle size of the suspended pigment. From the photographs taken during different periods of rotation the distribution of particle size can be calculated by known methods covered in the references cited above.

When tested by the above procedure a titanium dioxide pigment produced by the preferred process described in these specifications shows the following characteristics: The limits of particle sizes are 0.03 micron to 0.65 micron in diameter. This is an unusually small range for any pigment. The average particle size is 0.33 micron diameter, which is very close to the optimum diameter for maximum hiding power. The narrow range of particle size on either side of the mean is indicated also by the following figures:

| | Per cent |
|---|---|
| Below .04 micron diameter | .03 |
| Below .08 micron diameter | .42 |
| Below .16 micron diameter | 3.33 |
| Below .20 micron diameter | 7.27 |
| Above .48 micron diameter | 7.11 |
| Above .60 micron diameter | .43 |

From the above figures it will be noted that the major portion of our pigment falls between .20 and .60 micron diameter. (In this particular case 92.3%.) Further, the fraction between .20 and .48 micron diameter is still above 85%. This represents extreme uniformity and is only obtained by our special process, as previously examined titanium dioxide pigments show a very much wider range of particle size. Normally the pigment prepared by our novel process contains a major portion, namely more than 50%, of particles within the range of 0.2 to 0.60 micron in diameter, and the best pigments contain over 95% of particles between 0.03 and 0.65 micron in diameter.

From an examination of various samples of titanium oxide pigments obtained by our process, it was found in confirmation of the above that they are composed of particles having an average size of between 0.1 to 0.6 micron diameter, 95% of the particles being within the range of 0.01 to slightly over 1.0. The best pigments have an average particle size of between 0.25 to 0.45 with a distribution of 95% of the particles between 0.03 and 0.65 micron diameter.

The whiteness of our titanium dioxide was determined on a standard spectral photometer, such as described in Research Paper #30, Bureau of Standards Journal of Research, November, 1928. The apparatus used to measure the spectral reflectance relative to MgO was the one disclosed in "The Computation of colorimetric purity", by I. G. Priest, Journal of the Optical Society of America, and Review of Scientific Instruments vol. 9, pp 504–505, November, 1924. The brightness relative to MgO calculated from the data obtained of the particular sample of pigment made according to our process was .946 relative to MgO; the dominant wave length was 576.6 and the saturation 0.062. These figures mean to say that the whiteness of our pigment was 94.6% of that of magnesium oxide which is considered to be the whitest pigment available. It will be seen from these figures that our pigment is of exceedingly high grade and eminently suited for use in the production of perfectly white paints, or white shades in admixture with other solid substances.

This application is a division of our application Serial No. 594,384, filed Feb. 20, 1932.

We claim:

1. A pigment comprising a precipitated and heat treated titanium dioxide pigment of a whiteness at least 91% that of standard magnesium oxide, said $TiO_2$ showing under X-ray analysis among the diffraction patterns of $TiO_2$ that of rutile only.

2. A pigment comprising a precipitated and heat treated titanium dioxide pigment of a whiteness at least 94.6% that of standard magnesium oxide, said pigment showing under X-ray analysis among the diffraction patterns of $TiO_2$ that of rutile only.

3. The pigment of claim 1 when of an average particle size from 0.1 to 0.6 micron diameter.

4. The pigment of claim 1 when of an average particle size from 0.25 to 0.45 micron diameter.

5. The pigment of claim 1 when of great uniformity of particle size and of an average particle size from 0.25 to 0.45 micron diameter.

6. The pigment of claim 1 when over 95% of the particles therein have a size between 0.03 and 0.65 micron diameter.

7. The pigment of claim 1 when the major portion of the particles therein have a size between 0.2 and 0.6 micron diameter.

8. The pigment of claim 1 when of an average particle size between 0.1 and 0.6 and 95% of the particles are within the range of 0.1 and 1.0 micron diameter.

9. The pigment of claim 1 when of an average particle size between 0.25 and 0.45 and 95% of the particles are within the range of 0.03 to 0.65 micron diameter.

10. A titanium dioxide pigment of a whiteness at least 91% that of standard magnesium oxide, said pigment showing under X-ray analysis among the diffraction patterns of $TiO_2$ that of rutile only, and having been obtained by heat treating a hydrated titanium oxygen compound showing under X-ray analysis among the diffraction patterns of $TiO_2$ that of rutile only.

11. The pigment of claim 10 when of an average particle size from 0.1 to 0.6 micron diameter.

12. The pigment of claim 10 when of an average particle size from 0.25 to 0.45 micron diameter.

13. The pigment of claim 10 when of great uniformity of particle size and of an average particle size from 0.25 to 0.45 micron diameter.

14. The pigment of claim 10 when over 95% of the particles therein have a size between 0.03 and 0.65 micron diameter.

15. The pigment of claim 10 when the major portion of the particles therein have a size between 0.2 and 0.6 micron diameter.

16. The pigment of claim 10 when of an average particle size between 0.1 and 0.6 and 95% of the particles are within the range of 0.01 and 1.0 micron diameter.

17. The pigment of claim 10 when of an average particle size between 0.25 and 0.45 and 95% of the particles are within the range of 0.03 and 0.65 micron diameter.

PAUL KUBELKA.
JOSEF SRBEK.